United States Patent Office 3,525,763
Patented Aug. 25, 1970

1

3,525,763
PRODUCTION OF SALTS OF ORGANO-
FLUOROSILICIC ACIDS
Richard Müller and Christian Dathe, Radebeul, Germany, assignors to Institut fur Silikon- und Fluorkarbonchemie, Radebeul, Germany
No Drawing. Filed Aug. 17, 1966, Ser. No. 572,914
Int. Cl. C07f 7/08
U.S. Cl. 260—448.2                                    5 Claims

ABSTRACT OF THE DISCLOSURE

A process for producing salts of organofluorosilicic acids of the formula $M_m[RSiF_{m+3}]$, in which M stands for the cations of ammonium, sodium or potassium, $m$ stands for 1, 2, or 3; and R designates specifically defined alkyl, cycloalkyl, alkenyl, cycloalkenyl or phenyl groups, and such of the beforementioned groups in which hydrogen atoms bound to carbon are substituted by OH—, $SO_3H$— or $NO_2$; the process comprising reacting trifunctional organosilanes of the formula $RSiX_3$, in which R stands for the beforementioned groups and X is a substituent selected from the group consisting of alkoxy, acyloxy and sulfide, with $NH_4F$, NaF and KF or the bifluorides of $NH_4$, Na or K, thereby replacing said X by fluorine, and wherein the ratio of fluorinating agent to silane is at least 4:1. The products obtained are starting materials for metalorganic compounds, e.g. organomercury which may in turn be used as disinfectants, anticonceptives and the like.

---

The present invention relates to the production of salts of organofluorosilicic acids from trifunctional organofluorosilanes.

It is already known to make salts of organofluorosilicic acids by reacting organotrifluorosilanes with alkali metal fluorides or ammonium fluorides. When, for instance, gaseous methylfluorosilane of the formula $CH_3SiF_3$ is introduced into a solution of $NH_4F$ in water, a crystalline compound will be precipitated which consists of an ammonium-methyl-pentafluorosilicate, a complex salt of the formula $(NH_4)_2[CH_3SiF_5]$, providing that the solution is sufficiently concentrated.

Similarly, by introducing $CH_3SiF_3$ into an aqueous solution of NaF, the salt $Na_2[CH_3SiF_5]$ will be formed.

Organopentafluorosilicates of low solubility, such as $K_2[CH_3SiF_5]$, can be prepared either by the direct reaction or by addition of $K^+$-ions to the solutions of more readily soluble salts of organopentafluorosilicic acids.

The reaction can either be carried out in water or in an anhydrous organic solvent. Thereby, in addition to the usually obtained organopentafluorosilicates, it is possible that organotetrafluorosilicates ($[RSiF_4]$) or organohexafluorosilicates ($[RSiF_6]^3$) are formed. Thus, for instance, from a solution of $[(C_2H_5)_4N]F$ in absolute ethanol, which is saturated with $CH_3SiF_3$, the corresponding organotetrafluorosilicate will crystallize upon evaporation; the formula is $[(C_2H_5)_4N][CH_3SiF_4]$.

Instead of the organotrifluorosilanes, the similar organotricholorosilanes or chlorohydrosilanes may be used, provided they will be converted into the organotrifluorosilanes by means of the complex-forming ammonium- or alkali metal fluorides which are used in excess amounts in aqueous solutions or in solutions of organic solvents.

2

For instance, $CH_3SiHCl_2$ in aqueous solution reacts according to the following equation:

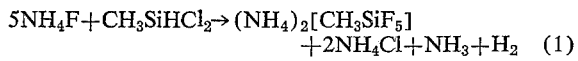

$$5NH_4F + CH_3SiHCl_2 \rightarrow (NH_4)_2[CH_3SiF_5] + 2NH_4Cl + NH_3 + H_2 \quad (1)$$

The thus obtained organofluorosilicates are important starting materials for metalorganic compounds. When, for instance, their aqueous solutions are reacted with mercury salts, the corresponding organomercury salts will be formed quantitatively and in pure state, or the diorganomercury compounds, which may in turn be used as seed disinfectants, anticonceptives, and the like.

It is the object of the present invention to broaden the scope of complex organofluorosilicate production and to develop means for making them from different starting materials, whereby technical and economical improvements in this art are brought about.

Other objects and advantages of the invention will be apparent from the following detailed description and the examples.

It has been found according to the invention that the formation of fluorosilanes coupled with production of complex salts is not limited to the above-mentioned groups of fluorosilanes but that, in addition, all those trifunctional organosilanes can be used as starting materials which, as the ones named, yield trifluorosilanes when reacted with fluorides. We name as examples organotrialkoxysilanes, organosilthians, and organosilylesters.

When working in aqueous solutions, it is desirable to add to the fluoride solutions for reaction with alkoxysilanes the calculated amount of hydrofluoric acid for neutralizing the OH-ions formed as shown, for example, in the following equation:

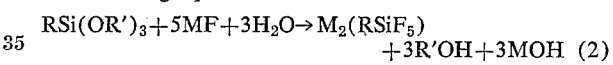

$$RSi(OR')_3 + 5MF + 3H_2O \rightarrow M_2(RSiF_5) + 3R'OH + 3MOH \quad (2)$$

In the formulas, R=R' stands for alkyl groups $C_nH_{2n+1}$ ($n=1-18$), cycloalkyls $C_nH_{2n-1}$ ($n=3-7$), alkenyls $C_nH_{2n-1}$ ($n=2-8$) or $C_nH_{2n-3}$ ($n=4-6$), cycloalkenyls $C_nH_{2n-3}$ ($n=4-8$). R=R' may also represent aryl of the formula $C_nH_{n-1}$ ($n=5-7$) or such compounds in which hydrogens linked to carbon are replaced by halogen, OH—, $SO_3H$—, or $NO_2$, or in which the carbons of the chain are linked by ether or thioether bonds. In the formula, M stands for ammonium, organoammonium, lithium, sodium, potassium, rubidium, or cesium. As suitable solvents, in which the reaction can be carried out, we name: water, methanol, and ethanol.

In the following, the invention will be more fully described in a number of examples, but it should be understood that these examples are only given by way of illustration and not of limitation.

EXAMPLE 1

55 g. molten methyltriacetoxysilane are added dropwise to 125 g. 45% $NH_4F$ solution within 35 minutes, while stirring and externally cooling with water. After another 45 minutes, the white precipitate which is formed is separated by suction filtration. Obtained are 11.5 g. ammoniummethylpentafluorosilicate. When the filtrate is cooled down to 0° C., another 8 g. salt may be obtained. Found: 20.0% N; calculated: 16.1% N, corresponding to 80% conversion.

By addition of KCl solution to the mother liquor, still remaining methylpentafluorosilicate is precipitated as 10 g. potassiummethylpentafluorosilicate K₂[CH₃SiF₅] of low solubility.

EXAMPLE 2

4 g. tetra-n-propyl-tetrasilthiane (n-C₃H₇SiS₁.₅)₄ having the structural formula:

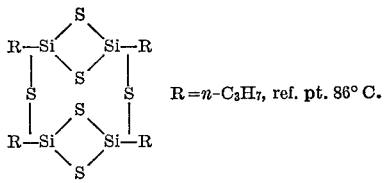

R = n-C₃H₇, ref. pt. 86° C.

(M. J. Etienne: Comp. Rend. Acad. Sci., 235 (1952), 966) are stirred at room temperature in 20 g. 45% aqueous NH₄F solution, whereupon 75 cc. methanol and thereafter 4 g. 40% hydrofluoric acid are added. After a few hours, the ammonium-propylpentafluorosilicate which precipitates is separated by suction filtration and in the filtrate, by addition of 45% KF solution, K₂[n-C₃H₇SiF₅] is precipitated and separated. For purification, the impure salt is dissolved in concentrated HCl and heated to 50° C. Thereby the escape of n-propyltrifluorosilane is caused, which is converted on conc. ammonium fluoride solution to the complex ammonium-propylpentafluorosilicate which remains dissolved.

By addition of conc. KCl solution, the potassium-n-propylpentafluorosilicate is precipitated again, which is of low solubility.

Yield: 12% of the theoretical, found: 14.1% C; 3.6% H; calc.: 14.75% C; 2.89% H, for K₂[C₃H₇SiF₅].

EXAMPLE 3

37 g. ammonium fluoride and 75 g. 40% hydrofluoric acid are entered first and 90 g. CH₃Si(OC₂H₅)₃ are added dropwise slowly at about 20° C. while shaking. After about 10 minutes, considerable heat evolution and slight formation of gas bubbles is setting in. The addition is completed within 2 hours, while cooling. Thereafter, heating to 50° C. takes place for one hour, the precipitated substance separated by suction filtration after cooling, rinsed twice with alcohol, and dried over P₂O₅.

Obtained are: 51 g. ammoniummethylpentafluorosilicate (NH₄)₂[CH₃SiF₅] corresponding to 59% of the theoretical.

EXAMPLE 4

In a glass flask provided with stirrer, thermometer and reflux cooler, 90 g. methyltriethoxysilane are heated slowly with 86 g. NH₄(HF₂) to 80° C. within 3 hours. The precipitated reaction product is washed with ethanol, and dried over P₂O₅, yielding 52 g.; 23.0% N.

By addition of KCl solution to the aqueous solution of this salt, 15 g. (14%) potassiummethylpentafluorosilicate K₂[CH₃SiF₅] are precipitated (43.7% F found, 43.92% calculated).

EXAMPLE 5

90 g. methyltriethyoxysilane are heated with 117 g. potassium bifluoride to boiling within 6 hours, and thereafter boiled for 54 hours under reflux, with slow decrease of temperature in the mixture. The reaction mixture is separated by suction filtration, the residue washed with ethanol, and suspended in water for dissolving residual potassium bifluoride and potassium fluoride formed. The less soluble potassiummethylpentafluorosilicate K₂[CH₃SiF₅]

is separated by suction filtration and dried. Yield: 34 g. (31%); calc.: 43.92% F, 36.07% K. Found by analysis: 43.3% F, 35.8% K.

EXAMPLE 6

37 g. dry NH₄F are heated in a flask, equipped with a small column, with 37 g. methyltriethoxysilane for 20 hours at 70 to 80° C., and the escaping ammonia is collected at −78° C. (7.5 g., 96%). Subsequently, the residue formed in the flask is separated by suction filtration, washed with ethanol, and dried over P₂O₅. Obtained 27 g., 20.0% N; calc. for (NH₄)₂[CH₃SiF₅] 16.0%, for NH₄F 37.81%. Based on these figures, the yield in complex salt was about 63%.

By precipitation with KCl, potassiummethylpentafluorosilicate (K₂[CH₃SiF₅]) was obtained in an amount of 6 g.; found 42.9% F, calc. 43.92%.

EXAMPLE 7

37 g. dry ammonium fluoride are heated with 38 g. vinyltriethoxysilane in a flask provided with reflux cooler, to a temperature of 60–70° C., whereby ammonia escapes (9 g. = 90% of the theoretical amount).

The residue is separated by suction filtration, washed with ethanol, dissolved in 2% NH₄F solution and filtered from a small amount of insoluble matter. From the filtrate, 23 g. (50%) potassiumvinylpentafluorosilicate, K₂[CH₂=CHSiF₅] are precipitated by addition of KCl solution.

*Analysis.*—Calc. (percent): C, 10.52; H, 1.33. Found (percent): C, 10.1; H, 1.8.

EXAMPLE 8

37 g. dry ammonium fluoride are heated on a water bath with 48 g. phenyltriethoxysilane in a manner similar to the one described in Example 7. Heating is carried out on a water bath to a temperature of 70° C. for 30 hours, during which time 8.5 g. NH₃, corresponding to 85% of the theoretical, escape. The residue amounting to 47 g., that is 100% calculated as (NH₄)₂[C₆H₅SiF₅], is worked up as described in Example 7.

Yield in K₂[C₆H₅SiF₅], 22 g. (40% of the theoretical).

*Analysis.*—Calc. (percent): C, 25.89; H, 1.81. Found (percent): C, 27.0; H, 3.2.

While certain embodiments of the invention have been described, it should be understood that the foregoing disclosure relates only to preferred embodiments which are intended to include all changes and modifications of the examples described within the scope of the invention as set forth in the appended claims.

What we claim is:

1. A process for producing salts of organofluorosilicic acids of the formula M_m[RSiF_{m+3}], in which M stands for the cations of ammonium, sodium or potassium; m stands for 1, 2 or 3; and R designates alkyl with $C_nH_{2n+1}$, n=1–18; cycloalkyl with $C_nH_{2n-1}$, n=3–7; alkenyl with $C_2H_{2n-1}$, n=2–8; or $C_nH_{2n-3}$, n=4–6; cycloalkenyl with $C_nH_{2n-3}$, n=4–8; or phenyl and such of the above-mentioned groups in which hydrogen atoms bound to carbon are substituted by OH—, SO₃H— or NO₂; which process comprises reacting trifunctional organosilanes of the formula RSiX₃, in which R stands for the above-mentioned groups and X is a substituent selected from the group consisting of alkoxy, acyloxy and sulfide, with NH₄F, NaF or KF or the bifluorides of NH₄, Na or KF, thereby replacing said X by fluorine, and wherein the ratio of fluorinating agent to silane is at least 4:1.

2. The process as defined in claim 1, in which M stands for NH₄—, Na or K; and R designates methyl, ethyl, propyl, vinyl or phenyl; m stands for 1 or 2; which process comprises reacting trifunctional organosilanes of the formula RSiX₃, in which R stands for the above-mentioned groups and X is a substituent selected from the group consisting of alkoxy, acyloxy and sulfide, with NH₄F, NaF or KF, thereby replacing said X by fluorine.

3. The process as defined in claim 2, wherein the reaction is made to take place in aqueous solution.

4. The process as defined in claim 3, wherein the substitution by fluorine occurs in the presence of HF in an amount calculated to neutralize liberated OH groups.

5. The process as defined in claim 2, wherein the reaction is made to take place in an organic solvent.

References Cited

UNITED STATES PATENTS 2,580,473  1/1952  Sowa et al. _____ 260—448.2

FOREIGN PATENTS 981,268   1/1965  Great Britain.
1,395,223 3/1965  France.

TOBIAS E. LEVOW, Primary Examiner
P. F. SHAVER, Assistant Examiner

U.S. Cl. X.R.

260—431